US010897471B2

(12) United States Patent
Nandy et al.

(10) Patent No.: US 10,897,471 B2
(45) Date of Patent: Jan. 19, 2021

(54) INDICATING MALICIOUS ENTITIES BASED ON MULTICAST COMMUNICATION PATTERNS

(71) Applicant: Hewlett Packard Enterprise Development LP, Houston, TX (US)

(72) Inventors: Tathagata Nandy, Bangalore (IN); Vijay Kannan, Bangalore (IN); Saheli Ganguly, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 236 days.

(21) Appl. No.: 15/953,420

(22) Filed: Apr. 14, 2018

(65) Prior Publication Data

US 2019/0238569 A1 Aug. 1, 2019

(30) Foreign Application Priority Data

Jan. 30, 2018 (IN) .............................. 201841003529

(51) Int. Cl.
| H04L 9/00 | (2006.01) |
| H04L 29/06 | (2006.01) |
| H04L 12/927 | (2013.01) |
| H04L 12/931 | (2013.01) |
| G06F 21/55 | (2013.01) |

(Continued)

(52) U.S. Cl.
CPC ........ *H04L 63/1416* (2013.01); *G06F 21/554* (2013.01); *H04L 47/806* (2013.01); *H04L 49/201* (2013.01); *H04L 63/0227* (2013.01); *H04L 63/1425* (2013.01); *H04L 63/1441* (2013.01); *H04L 63/20* (2013.01); *H04L 69/325* (2013.01)

(58) Field of Classification Search
CPC . H04L 63/1416; H04L 47/806; H04L 49/201; H04L 63/0227; H04L 63/1425; H04L 63/1441; H04L 63/20; G06F 21/554
USPC ............................................................ 726/1
See application file for complete search history.

(56) References Cited

U.S. PATENT DOCUMENTS

| 7,573,881 B2 | 8/2009 | Cain et al. |
| 7,657,628 B1 * | 2/2010 | McDysan ........... G06F 11/2028 370/401 |
| 7,693,146 B2 | 4/2010 | Subramanian |

(Continued)

FOREIGN PATENT DOCUMENTS

WO  WO-2016204838 A2  12/2016

OTHER PUBLICATIONS

Al-Shaer, E. et al., MRMON: Remote Multicast Monitoring, (Research Paper), Retrieved Oct. 2, 2017, 14 Pgs.

(Continued)

*Primary Examiner* — Haresh N Patel
(74) *Attorney, Agent, or Firm* — Trop, Primer & Hu, P.C.

(57) ABSTRACT

In some examples, a network device includes an interface, and a processor to apply a restriction on multicast communication associated with an entity on the interface. The restriction on multicast communication includes detecting, on the interface, a multicast communication pattern associated with the entity, indicating, based on the multicast communication pattern on the interface violating a threshold, that the entity is malicious, and blocking processing of the multicast communication associated with the entity in response to indicating that the entity is malicious.

20 Claims, 5 Drawing Sheets

(51) Int. Cl.
*G06F 11/30* (2006.01)
*H04L 29/08* (2006.01)

(56) References Cited

U.S. PATENT DOCUMENTS

| | | | |
|---|---|---|---|
| 7,835,276 B2 | 11/2010 | Naik et al. | |
| 8,203,943 B2 | 6/2012 | Dec | |
| 8,255,996 B2 | 8/2012 | Elrod et al. | |
| 8,295,300 B1* | 10/2012 | Chartier | H04L 12/1854 370/432 |
| 9,609,021 B2 | 3/2017 | Wanser et al. | |
| 10,574,688 B1* | 2/2020 | Hagelstrom | H04L 63/1441 |
| 2010/0046516 A1* | 2/2010 | Fernandez Gutierrez | H04L 12/185 370/390 |
| 2010/0248742 A1* | 9/2010 | Song | H04L 12/185 455/456.1 |
| 2012/0151561 A1* | 6/2012 | Kreiner | H04L 12/1845 726/4 |
| 2016/0226672 A1* | 8/2016 | Calciu | H04L 12/1863 |
| 2016/0294884 A1* | 10/2016 | Vincent | H04L 65/1069 |
| 2016/0373470 A1 | 12/2016 | Boss et al. | |
| 2017/0055133 A1* | 2/2017 | Dieselberg | H04W 4/08 |
| 2017/0085488 A1* | 3/2017 | Bhattacharya | H04L 41/0813 |
| 2017/0245120 A1* | 8/2017 | Huang | H04W 4/06 |
| 2017/0324571 A1 | 11/2017 | Bontu et al. | |
| 2017/0359372 A1* | 12/2017 | Ronen | H04L 63/1458 |
| 2017/0373927 A1* | 12/2017 | Nandy | H04L 12/185 |
| 2018/0062930 A1* | 3/2018 | Dhesikan | H04L 43/0864 |
| 2018/0176121 A1* | 6/2018 | Jayaraman | H04L 45/16 |
| 2018/0241674 A1* | 8/2018 | Balaji | H04L 47/12 |
| 2018/0248804 A1* | 8/2018 | Nandy | H04L 47/805 |
| 2018/0316655 A1* | 11/2018 | Mani | H04L 61/1511 |
| 2019/0058635 A1* | 2/2019 | Nandy | H04L 45/48 |
| 2019/0068387 A1* | 2/2019 | Nandy | H04L 12/18 |
| 2019/0068405 A1* | 2/2019 | Nandy | H04L 49/70 |
| 2019/0207976 A1* | 7/2019 | Yadav | H04L 63/20 |
| 2019/0215264 A1* | 7/2019 | Nandy | H04L 41/12 |
| 2019/0238569 A1* | 8/2019 | Nandy | G06F 21/554 |
| 2019/0334808 A1* | 10/2019 | Nandy | H04L 45/021 |
| 2019/0334810 A1* | 10/2019 | Nandy | H04L 45/42 |
| 2019/0334980 A1* | 10/2019 | Nagaraju | H04L 67/322 |
| 2020/0021450 A1* | 1/2020 | Nandy | H04L 12/1886 |
| 2020/0067808 A1* | 2/2020 | Nandy | H04L 43/0894 |
| 2020/0092139 A1* | 3/2020 | Nandy | H04L 12/4679 |
| 2020/0112450 A1* | 4/2020 | Chhabra | H04L 12/1822 |

OTHER PUBLICATIONS

Cain, B. et al, Internet Group Management Protocol, Version 3, Oct. 2002, 54 Pgs., https://tools.ietf.org/html/rfc3376.

Sung Hei Kim et al, PIM Multicast Spam Countering Method Using Blacklist in Rendezvous Point, Feb. 17-20, 2008, 1 Pg., http://ieeexplore.ieee.org/xpl/articleDetails.jsp?arnumber=4493821.

W. Fenner, Internet Group Management Protocol, Version 2, Nov. 1997, 24 Pgs., https://tools.ietf.org/html/rfc2236.

\* cited by examiner

INDICATING MALICIOUS ENTITIES BASED ON MULTICAST COMMUNICATION PATTERNS

BACKGROUND

A network device is a device in a network that processes or handles network-related events. The network device can include a switch, a router, or any other type of device through which data is passed in a communication between other devices. In some examples, a network-related event can include a request to perform an action in the network. In other examples, a network-related event can include a traffic transmission that includes traffic data transmitted between devices through the network.

BRIEF DESCRIPTION OF THE DRAWINGS

Some implementations of the present disclosure are described with respect to the following figures.

Figure 1:
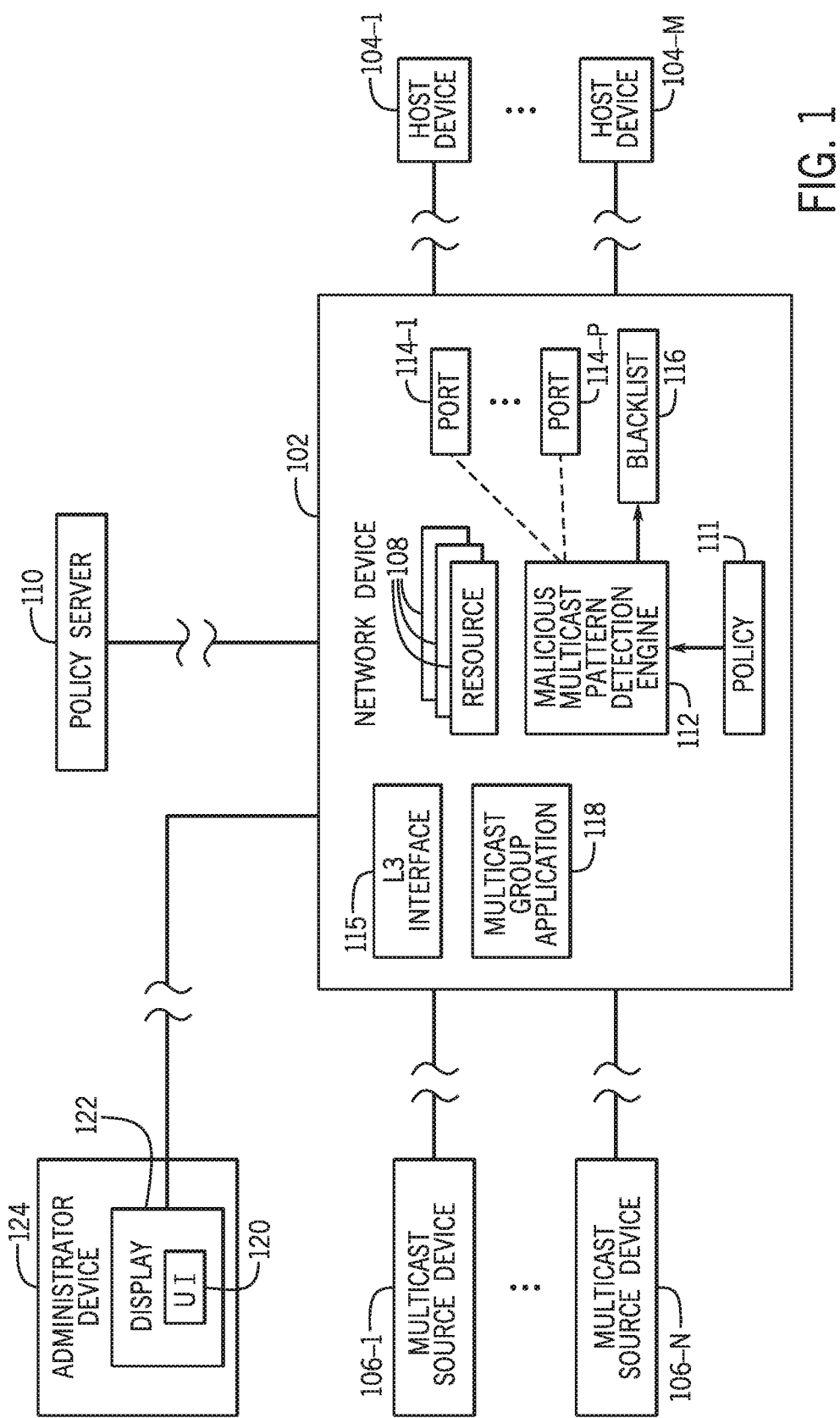
FIG. 1 is a block diagram of a network arrangement including a network device and other devices, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Certain network devices are able to perform multicast transmissions in a network. A multicast transmission refers to a transmission in which traffic data is transmitted from a source device to multiple destination devices. For example, the traffic data can include a multicast packet that includes a multicast destination address. The multicast packet is transmitted to each of destination devices that are associated with the multicast destination address.

A network device can include resources used for multicast network-related events. A multicast-related event can include a request to join a multicast group. A multicast group includes members to which multicast traffic data targeted to the multicast group is to be transmitted. An entity can send, to the network device, a request to join a multicast group (referred to as a "multicast group join request"). An example of a multicast group join request is a join request according to the Internet Group Management Protocol (IGMP). An "entity" can refer to an electronic device (e.g., a computer, a smartphone, a game appliance, an Internet of Things (IoT) device, a vehicle, etc.), or a logical entity in an electronic device. The logical entity can include machine-readable instructions (e.g., a software application, an operating system, a firmware) or a virtual machine.

In response to the multicast group join request from an entity, the network device can allocate a resource of the network device to process multicast communications for the entity. The resource can include a filter that identifies whether a multicast transmission from a source should be transmitted to the entity, based on the multicast group membership of the entity. In some examples, the filter is a hardware resource of the network device, such as a programmable integrated circuit device. In other examples, the filter can be a software or firmware resource (e.g., a resource implemented with machine-readable instructions).

In other examples, other resources of the network device can be used to process or handle other multicast-related events.

A malicious entity is an entity that is not authorized to perform communications in a network. A malicious entity can cause an attack of the network, such as a distributed denial-of-service (DDoS) attack, cause unauthorized activities to occur in various devices of the network, and/or steal information accessible over the network. In some cases, a malicious entity can submit a large number of multicast group join requests to a network device to join respective different multicast groups. In response to each multicast group join request from the malicious entity, the network device allocates a respective resource (e.g., a filter) in the network device. For a large number of multicast group join requests, the network device can quickly run out of resources for other multicast group join requests from non-malicious entities.

In other cases, a malicious entity can be a source of a multicast transmission (which can be in the form of a flow of multicast packets). The malicious entity can send a large number of multicast transmissions that are to be passed through a network device. The network device can become overburdened by the large number of multicast transmission from the malicious entity.

In accordance with some implementations of the present disclosure, to address the issue of malicious entities consuming resources of a network device for multicast-related events, the network device applies a policy-based restriction on multicast communication associated with an entity on an interface of the network device. The policy-based restriction includes detecting, on the interface of the network device, a multicast communication pattern associated with the entity, indicating, based on the multicast communication pattern on the interface violating a threshold, that the entity is malicious, and blocking processing of the multicast communication associated with the entity in response to indicating that the entity is malicious. The threshold and action to take against the malicious entity can be specified by a policy.

FIG. 1 is a block diagram of an example network arrangement that includes a network device 102, which can be a switch, a router, or any other type of device through which communication of data is able to pass between endpoint devices. Although FIG. 1 shows just one network device 102, it is noted that in other examples, there can be multiple network devices that are part of an overall network.

In the example of FIG. 1, the endpoint devices include host devices 104-1 to 104-M, and multicast source devices 106-1 to 106-N, where M≥1 and N≥1. A "host device" can refer to an electronic device that is able to submit a multicast group join request to join a multicast group. A "multicast source device" can refer to an electronic device that is able to transmit multicast traffic data. It is noted that the roles of a host device and a multicast source device as depicted in FIG. 1 can be reversed, in which at different times, a host device can be a multicast source device that transmits multicast traffic data, while a multicast source device can be a host device that is able to submit a multicast group join request to the network device.

Examples of electronic devices include any or some combination of the following: a desktop computer, a notebook computer, a tablet computer, a smartphone, a game appliance, a wearable device (e.g., a smart watch, smart eyeglasses, a head-mounted device, etc.), a vehicle, an Internet of Things (IoT) device, a server computer, a storage system, or any other type of electronic device that is able to communicate over a network.

The network device 102 includes resources 108 that are used for multicast-related events. For example, a subset of the resources 108 includes filters allocated in response to a multicast group join request from a host device 104-$i$ ($i$=1 to M). The filter when allocated to the host device 104-$i$ is able to identify whether a multicast transmission, as transmitted by a multicast source device 106-$j$ ($j$=1 to N), is to be routed to the host device 104-$i$, based on the multicast group membership of the host device 104-$i$.

In other examples, other types of resources are present in the network device 102. For example, another subset of the resources 108 can further include switching resources that route multicast packets based on multicast addresses in the multicast packets.

The network device 102 includes various ports 114-1 to 114-P, where P≥1. In some examples, each port 114-$k$ ($k$=1 to P) can be a virtual port, such as the virtual port of a virtual local area network (VLAN) that is established through the network device 102. In other examples, a port 114-$k$ can be a physical port of the network device 102. A host device 104-$i$ can submit a multicast group join request to a particular port 114-$k$ of the network device 102. A multicast packet can also be sent by a multicast source device 106-$j$ to a particular port 114-$k$ of the network device 102.

The network device 102 includes a multicast group application 118 (e.g., an IGMP application) that receives a multicast group join request (e.g., an IGMP join request) from a host device 104-$i$ at a port 114-$k$. The multicast group application 118 can be implemented as machine-readable instructions executable on the network device 102, or can be implemented using a hardware processing circuit. A hardware processing circuit includes any or some combination of the following: a microprocessor, a core of a multi-core microprocessor, a microcontroller, a programmable integrated circuit device, a programmable gate array, or any other type of hardware processing circuit.

In response to the multicast group join request from the host device 104-$i$, the multicast group application 118 allocates a resource 108 (e.g., a filter) associated with the port 114-$k$ to the host device 104-$i$ for the multicast group. The same filter can be allocated to multiple host devices that have submitted multicast group join requests to be members of the same multicast group. However, a single host device that has submitted multiple multicast group join requests for multiple multicast groups to a single port of the network device 102 would consume multiple filters in the network device 102.

The network device 102 also includes a layer 3 (L3) interface 115 that receives traffic data transmitted over a network, such as multicast traffic data transmitted by a multicast source device 106-$j$. The L3 interface can include an Internet Protocol (IP) layer of the network device 102 for handling IP communications, including IP multicast traffic data. A multicast source device 106-$j$ can send multicast traffic data to multicast groups that can be received through the L3 interface 115.

In some examples, the network device 102 can interact with a policy server 110. The policy server 110 can maintain various policies to be applied by the network device 102 (or by multiple network devices). A policy can be retrieved by the network device 102 from the policy server 110 for use by the network device 102. The policy retrieved by the network device 102 from the policy server 110 can include a multicast entity detection policy 111 used by the network device 102 for detecting a malicious multicast pattern indicative of either a malicious host device or a malicious multicast source device. The multicast entity detection policy 111 can also specify a remediation action to take once a malicious entity is detected.

In other examples, instead of retrieving a multicast entity detection policy 111 from the policy server 110 for use by the network device 102, the network device 102 can instead be configured with the multicast entity detection policy 111 stored in a storage of the network device 102. In such latter examples, the policy server 110 can be omitted, or alternatively, the policy server 110 does not provide multicast entity detection policies.

The network device 102 includes a malicious multicast pattern detection engine 112 according to some implementations of the present disclosure. The malicious multicast pattern detection engine 112 can use the multicast entity detection policy 111 to detect whether a multicast communication pattern, at an interface (a port 114-$k$ or L3 interface 115) of the network device 102, associated with an entity (either a host device or a multicast source device) is malicious, and the malicious multicast pattern detection engine 112 is able to take action to address the identified malicious multicast entity. Any entity identified as malicious can be included in a blacklist 116 of malicious entities. The blacklist 116 is a data structure that includes identifiers of entities identified as malicious.

In some examples, the malicious multicast pattern detection engine 112 is implemented as a hardware processing circuit. In other examples, the malicious multicast pattern detection engine 112 includes a combination of a hardware processing circuit and machine-readable instructions executable on the hardware processing circuit.

In an example, the malicious multicast pattern detection engine 112 can be part of a policy monitoring subsystem that monitors the health and performance of a network. The policy monitoring subsystem is able to predict and detect issues in the network, to prevent issues from affecting productivity of users or devices on the network.

In some examples, entities identified by the blacklist 116 of entities can be presented in a user interface (UI) 120 that is displayed in a display device 122 of an administrator device 124. The administrator device 124 can be remotely coupled to the network device 102, such as over a network. The administrator device 124 can include a desktop computer, a notebook computer, a smartphone, a tablet computer, or any other type of electronic device. The UI 120 can present information identifying the entities in the blacklist of entities 116. The UI 120 can also include control elements or input fields to receive user input to remove a particular entity from the blacklist of entities 116.

In this way, an administrator or other user at the administrator device 124 can override the blacklisting of entities by the malicious multicast pattern detection engine 112, by removing an entity from the blacklist of entities 116.

In further examples, the blacklist of entities 116 can be exported to another application (aside from the multicast group application 118) in the network device 102. Exporting the blacklist of entities 116 to the other applications (which can include a multicast application and/or a non-multicast application) can refer to communicating the blacklist of entities 116 to the other applications or providing a location information of the blacklist of entities 116 to allow the other applications to retrieve the blacklist of entities 116 using the location information.

An example of such other applications is an Address Resolution Protocol (ARP) application that maps IP addresses to MAC addresses. There can be other applications in the network device 102 in other examples. Exporting the blacklist 116 to the other application allows the other application to no longer interact with a host device identified in the blacklist of entities 116, and/or to no longer perform operations for the host device identified in the blacklist of entities 116. In this manner, the other application does not have to perform an independent assessment of whether or not a host device is a malicious host device.

Another example of another application is a malware scanning application, which can attempt to detect presence of a malware based on detecting a rate of connection requests. If the rate of connection requests from an entity exceeds a threshold, then the entity can be identified as having been infected by malware. By exporting the blacklist of entities 116 to the malware scanning application, the malware scanning application is able to identify an entity in the blacklist of entities 116 as being malicious without having to compare the rate of connection requests of the entity against the threshold.

In further examples, all processing or operations associated with a host device in the blacklist of entities 116 can be blocked by the network device 102. In other words, in addition to blocking processing of multicast-related events for host devices in the blacklist of entities 116, the network device 102 can also block processing or handling of any other type of events for a host device in the blacklist of entities 116.

Figure 2:
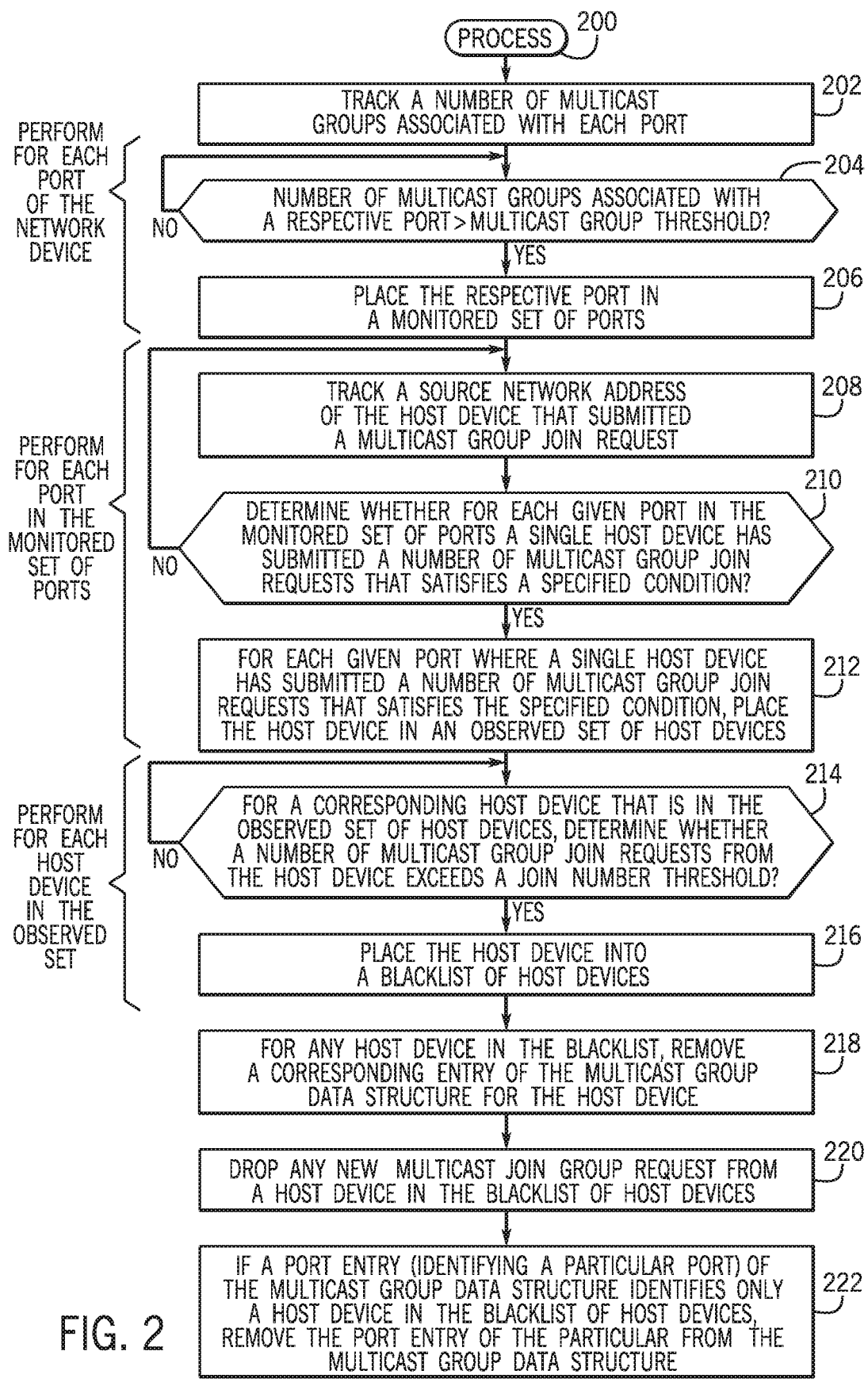
FIG. 2 is a flow diagram of a process of detecting and addressing a malicious host device, according to some examples.

FIG. 2 is a flow diagram of a process 200 of detecting and addressing malicious host devices, according to some implementations. The process 200 can be performed by the network device 102, including the malicious multicast patter detection engine 112. The process 200 can be performed on a periodic basis, in response to user request, or in response to another event at the network device 102.

The process 200 tracks (at 202) a number of multicast groups associated with each port of the ports 114-1 to 114-P. A multicast group is associated with a given port in response to receiving a multicast group join request from a host device at the given port. In some examples, the multicast group join request is an IGMP join request. In other examples, a multicast group join request can be according to a different protocol.

It is possible for multiple host devices to submit multicast group join requests to a single port. It is also possible for one host device to submit multiple multicast group join requests to a single port. Moreover, a host device can submit multicast group join requests to multiple ports 114-1 to 114-P.

The process 200 determines (at 204) whether a number of multicast groups associated with a respective port exceeds a multicast group threshold (which can be specified in the multicast entity detection policy 111). If the number of multicast groups associated with the respective port exceeds the multicast group threshold, the process 200 places (at 206) the respective port in a monitored set of ports. Placing a port in the monitored set of ports can refer to including an identifier (e.g., a port number) of the port in the monitored set of ports (which is a data structure such as a list, a table, a database, etc.). The determination (at 204) is performed for each port of the ports 114-1 to 114-P. The monitored set of ports produced (at 206) includes each port for which the number of multicast groups exceeds the multicast group threshold.

Any port of the ports 114-1 to 114-P not associated with a number of multicast groups exceeding the multicast group threshold (as determined at 204) is not placed in the monitored set of ports.

Tasks 204 and 206 are iterated for each of the P ports 114-1 to 114-P of the network device 102.

The process 200 monitors each port in the monitored set of ports to determine whether or not a host device that submitted multicast group join requests to the port is malicious. For each given port that is in the monitored set of ports, the process 200 tracks (at 208) a source network address of the host device that submitted a multicast group join request to the given port. The source network address can include a source Internet Protocol (IP) address or a source Medium Access Control (MAC) address.

The process determines (at 210) whether for each given port in the monitored set of ports a single host device (as identified by a network address tracked at 208) has submitted a number of multicast group join requests that satisfies a specified condition, which can be specified in the multicast entity detection policy 111. The specified condition can include (a) a condition where the single host device submitted all the multicast group join requests at the given port, or (b) a condition where the single host device has submitted greater than a specified threshold percentage of the multicast group join requests received at the given port.

As an example, to determine whether a particular host device has submitted greater than the specified threshold percentage of the multicast group join requests received at the given port, the process 200 determines (1) the number of multicast group join requests received from the particular host device at the given port, (2) the total number of multicast group join requests received at the given port (which can be from one or multiple host devices), and (3) divides the number (1) by the total number (2) to determine a percentage of the multicast group join requests received at the given port from the particular host device. If all the multicast group join requests at the given port is from the particular host device, then the determined percentage is 100%. If the determined percentage exceeds the specified threshold percentage, then the process places the particular host device in the observed set of host devices.

For each given port where a single host device has submitted a number of multicast group join requests that satisfies the specified condition, the process 200 places (at 212) the host device in an observed set of host devices. The condition under which a host device is placed in the observed set of host devices can be specified in the multicast entity detection policy 111. Placing a host device in the observed set of host devices can refer to including an identifier (e.g., a network address) of the host device in the observed set of host devices (which is a data structure such as a list, a table, a database, etc.). If it is determined (at 210) that the single host device has submitted a number of multicast group join requests that does not satisfy the specified condition, then the host device is not placed in the observed set of host devices.

Tasks 208, 210, and 212 are iterated for each port in the monitored set of ports.

For a corresponding host device that is in the observed set of host devices, the process 200 determines (at 214) whether a number of multicast group join requests from the host device exceeds a join number threshold (which can be specified in the multicast entity detection policy 111). If so, the process 200 places (at 216) the host device into a blacklist of host devices (by including an identifier of the host device, such as a network address of the host device, in the blacklist). If the number of multicast group join requests from the host device does not exceed the join number threshold (as determined at 214), then the host device is not added to the blacklist.

Tasks 214 and 216 are iterated for each host device in the observed set of host devices.

In some examples, the multicast group application 118 can track host devices that have submitted multicast group join requests in a multicast group data structure (e.g., a list, a table, a database, etc.).

For any host device in the blacklist of host devices, the process 200 removes (at 218) a corresponding entry of the multicast group data structure for the host device. Removing the corresponding entry of the multicast group data structure for the host device causes the multicast group application 118 to no longer track multicast transmissions on behalf of the host device identified in the removed entry. As a result, the multicast group application 118 can remove the allocation of the resource 108 previously allocated to the host device for the multicast group.

In addition the process 200 drops (at 220) any new multicast join group request from a host device in the blacklist of host devices. Dropping a multicast join group request means that that the network device 102 ignores or does not process the multicast join group request.

In further examples, the multicast group application 118 can track, in the multicast group data structure (e.g., a list, a table, a database, etc.), ports of the network device 102 at which multicast group join requests have been received. If a port entry (identifying a particular port) of the multicast group data structure identifies only a host device in the blacklist of host devices (and does not identify any other host device not in the blacklist), the process 200 removes (at 222) the port entry of the particular from the multicast group data structure so that the multicast group application 118 no longer has to track multicast events for the particular port.

Figure 3:
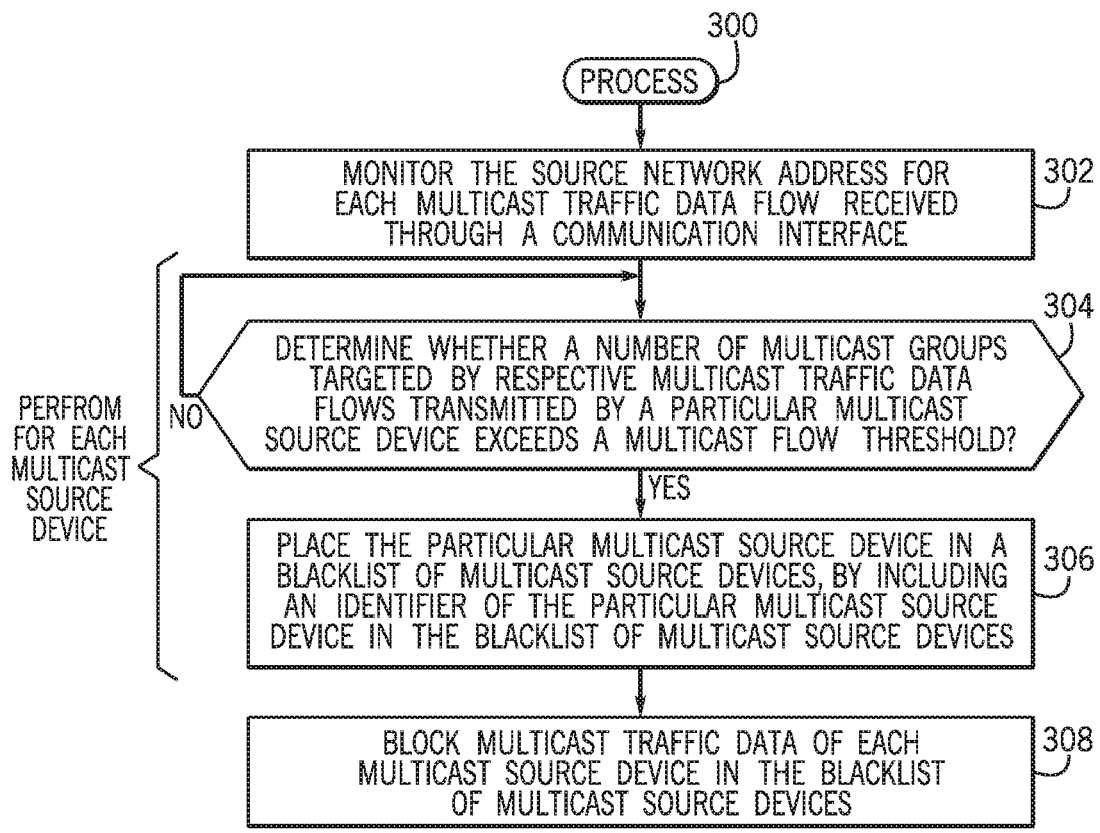
FIG. 3 is a flow diagram of a process of detecting and addressing a malicious multicast source device, according to further examples.

FIG. 2 refers to identifying malicious host devices. FIG. 3 is a flow diagram of a process 300 of detecting and addressing malicious multicast source devices, according to further implementations.

A malicious multicast source device can send multicast traffic data to multiple multicast groups. The multicast traffic data sent to multiple multicast groups includes multiple flows of multicast traffic data that can consume resources of the network device 102.

The process 300 monitors (at 302) the source network address (e.g., IP address) for each multicast traffic data flow received through a communication interface (e.g., the L3 interface 115 of FIG. 1) of the network device 102. Each multicast traffic data flow is sent to a respective multicast group. Multiple multicast traffic data flows may be sent to respective different multicast groups.

The process 300 determines (at 304) whether a number of multicast groups targeted by respective multicast traffic data flows transmitted by a particular multicast source device (as identified by a source network address) exceeds a multicast flow threshold (which can be specified by the multicast entity detection policy 111 of FIG. 1). If so, the process 300 places (at 306) the particular multicast source device in a blacklist of multicast source devices, by including an identifier of the particular multicast source device in the blacklist of multicast source devices. If the number of multicast groups targeted by respective multicast traffic data flows transmitted by the particular multicast source device does not exceed the multicast flow threshold (as determined at 304), then the particular multicast source device is not placed in the blacklist of multicast source devices.

Tasks 304 and 306 are iterated for each multicast source device that has transmitted multicast traffic data to the network device 102.

The process 300 can take a remediation action against each multicast source device in the blacklist of multicast source devices, including blocking (at 308) multicast traffic data of each such multicast source device. Blocking a multicast traffic data of a multicast source device can refer to dropping the multicast traffic data or otherwise not processing the multicast traffic data.

By using techniques or mechanisms according to some implementations of the present disclosure, malicious entities associated with multicast events can be identified, such that resources of a network device used for the multicast events are preserved for use by non-malicious entities. Requests and/or multicast traffic of malicious entities are disregarded by the network device, which frees up the resources. In some low-end network devices, the number of resources can be low, such that techniques or mechanisms according to some implementations of the present disclosure can prevent malicious entities from overwhelming such network devices and adversely impacting operational performance of a network.

Figure 4:
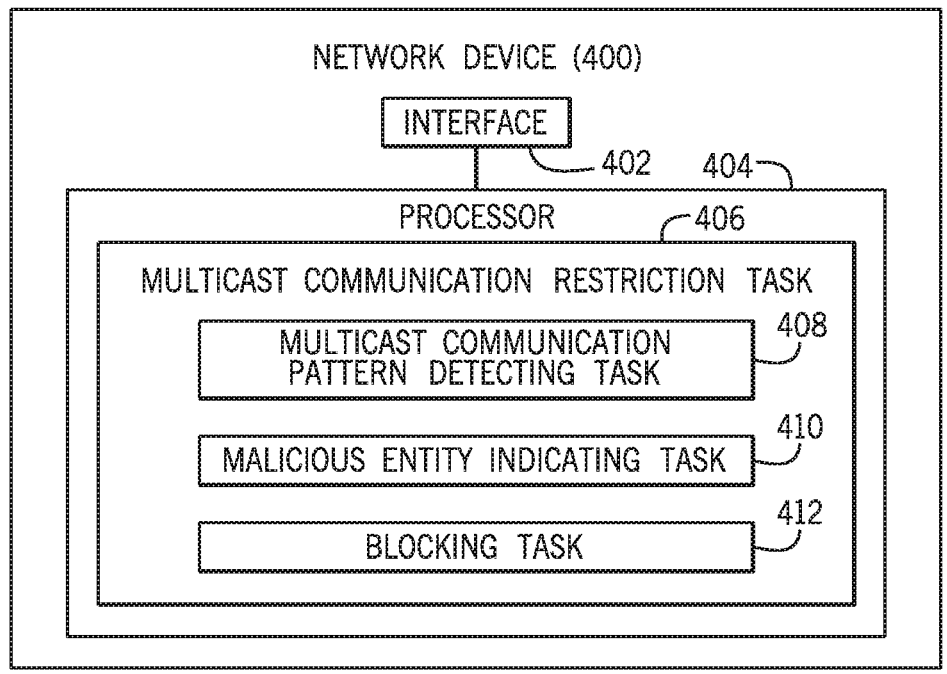
FIG. 4 is a block diagram of a network device according to additional examples.

FIG. 4 is a block diagram of a network device 400 that includes an interface 402 and a processor 404 (or multiple processors). The processor 404 can perform various tasks. A processor performing a task can refer to a single processor performing the task, or multiple processors performing the task. A processor can include a microprocessor, a core of a multi-core microprocessor, a microcontroller, a programmable integrated circuit, a programmable gate array, or another hardware processing circuit. The interface 404 can include a port 114-*k*, an L3 interface 115, or any other type of communication interface.

The tasks of the processor 404 include a multicast communication restriction task 406 to apply a restriction on multicast communication associated with an entity on the interface 402. The multicast communication restriction task 406 includes a multicast communication pattern detecting task 408 to detect, on the interface 402, a multicast communication pattern associated with the entity. The multicast communication restriction task 406 further includes a malicious entity indicating task 410 to indicate, based on the multicast communication pattern on the interface violating a threshold, that the entity is malicious. The multicast communication restriction task 406 additionally includes a blocking task 412 to block processing of the multicast communication associated with the entity in response to indicating that the entity is malicious. The blocking of the processing of the multicast communication can include (1) blocking processing for a request to join a multicast group received by the network device 400 from the entity, or (2) blocking forwarding by the network device 400 of a multicast traffic transmission received from the entity.

Figure 5:
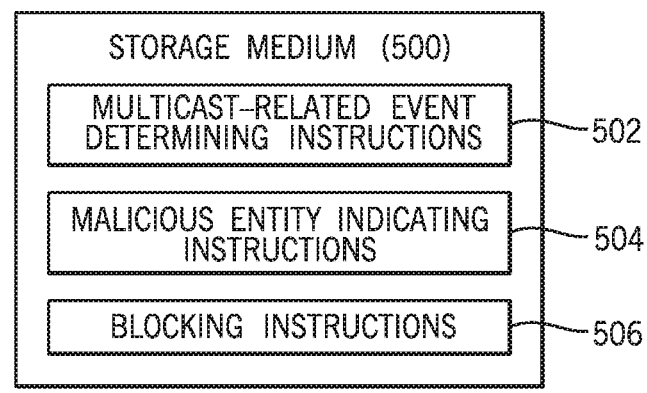
FIG. 5 is a block diagram of a storage medium storing machine-readable instructions according to other examples.

FIG. 5 is a block diagram of a non-transitory machine-readable or computer-readable storage medium 500 storing machine-readable instructions that upon execution cause a network device to perform various tasks. The machine-readable instructions include multicast-related event determining instructions 502 to determine, on an interface of the network device, whether a number of multicast-related events associated with an entity exceeds a threshold.

The determining of whether the number of multicast-related events associated with the entity exceeds the threshold includes determining whether a number of multicast group join requests received from the entity at a port exceeds the threshold. Alternatively, the determining of whether the number of multicast-related events associated with the entity exceeds the threshold comprises determining whether a number of multicast flows received from the entity at the interface exceeds the threshold.

The machine-readable instructions further include malicious entity indicating instructions 504 to indicate, based on the number of multicast-related events on the interface exceeding the threshold, that the entity is malicious. The machine-readable instructions also include blocking instructions 506 to block processing of a multicast communication associated with the entity in response to indicating that the entity is malicious.

The storage medium 500 of FIG. 5 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Figure 6:
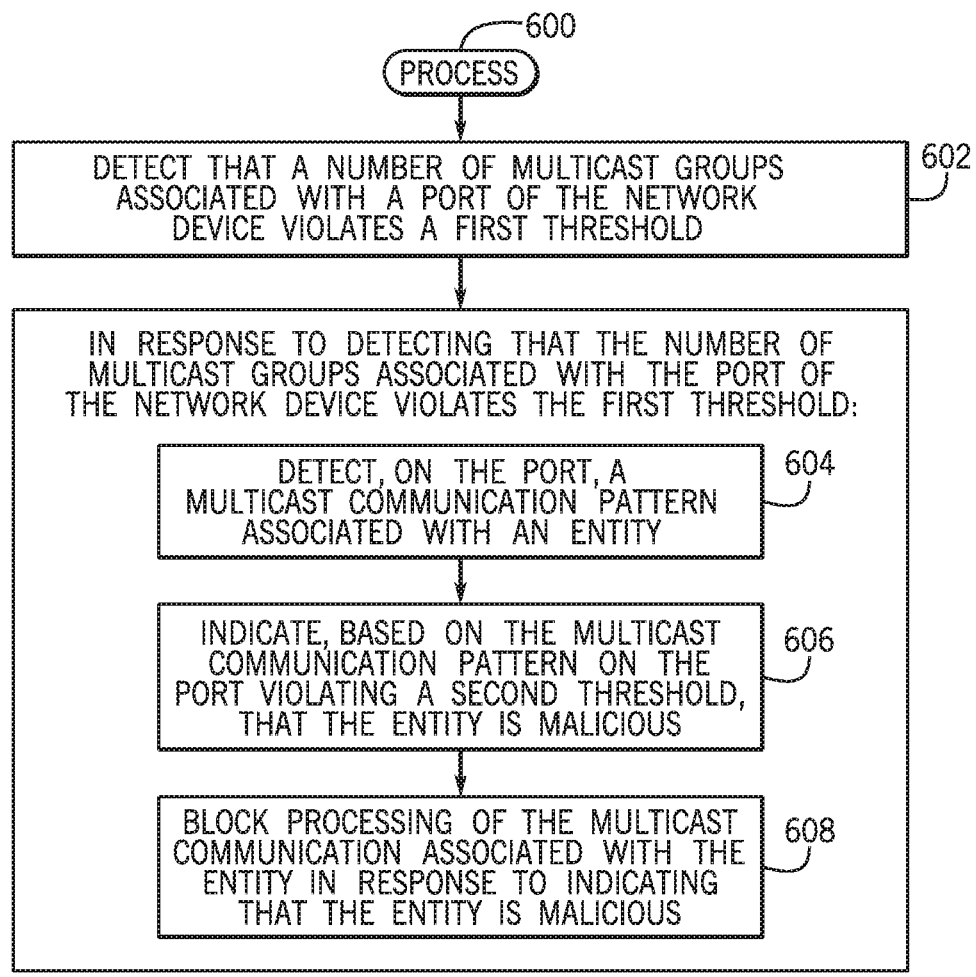
FIG. 6 is a flow diagram of a process of a network device according to yet further examples.

FIG. 6 is a flow diagram of a process 600 that can be performed by a network device according to further examples. The process 600 includes detecting (at 602) that a number of multicast groups associated with a port of the network device violates a first threshold. The process 600 further includes, in response to detecting that the number of multicast groups associated with the port of the network device violates the first threshold: detecting (at 604), on the port, a multicast communication pattern associated with an entity, indicating (at 606), based on the multicast communication pattern on the port violating a second threshold, that the entity is malicious, and blocking (at 608) processing of the multicast communication associated with the entity in response to indicating that the entity is malicious.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

We claim:

1. A network device comprising:
an interface; and
a processor; and
a storage device storing instructions that when executed by the processor cause the processor to perform a method to apply a restriction on multicast communication associated with an entity, the method comprising:
in response to determining that a number of multicast groups associated with the interface exceeds a first threshold value, placing the interface in a monitored set of interfaces;
determining whether a number of multicast communication requests received, by an interface in the monitored set of interfaces, from the entity exceeds a second threshold value;
indicating that the entity is malicious in response to the number of multicast communication requests exceeding the second threshold value; and
blocking processing of the multicast communication associated with the entity in response to indicating that the entity is malicious.

2. The network device of claim 1, wherein the multicast communication requests comprise requests to join multicast groups received from the entity, and the interface comprises a port at which the number of requests to join multicast groups is received.

3. The network device of claim 2, wherein the requests to join multicast groups comprise Internet Group Management Protocol (IGMP) requests.

4. The network device of claim 1, wherein the method further comprises:
indicating that the entity is malicious, in response to determining that a number of multicast traffic transmissions to different multicast groups received from the entity exceeds a third threshold value.

5. The network device of claim 4, wherein the number of multicast traffic transmissions to the different multicast groups are received from the entity through a layer 3 (L3) interface.

6. The network device of claim 1, wherein the blocking of processing of the multicast communication comprises blocking processing for a request to join a multicast group received from the entity.

7. The network device of claim 1, wherein the blocking of processing of the multicast communication comprises blocking forwarding of a multicast traffic transmission received from the entity.

8. The network device of claim 1, wherein the entity is identified by a network address of the entity.

9. The network device of claim 1, wherein the interface comprises a port, and wherein the processor is to:
detect that a number of multicast groups associated with the port violates a number of groups threshold,
wherein the restriction on multicast communication associated with the entity is performed in response to detecting that the number of multicast groups associated with the port violates the number of groups threshold.

10. The network device of claim 9, wherein the processor is to:
for the port on which the number of multicast groups violates the number of groups threshold, detect that the entity has submitted a number of multicast group join requests that satisfies a specified condition,
wherein the restriction on multicast communication associated with the entity is performed further in response to detecting that the entity has submitted the number of multicast group join requests that satisfies the specified condition.

11. The network device of claim 1, wherein the blocking of processing of the multicast communication associated with the entity in response to indicating that the entity is malicious is based on a policy.

12. The network device of claim 1, wherein the processor is to:
add an identifier of the entity to a blacklist to indicate that the entity is malicious.

13. The network device of claim 12, wherein the processor is to:
cause presentation of the entity added to the blacklist in a user interface;
receive, based on an input in the user interface, a request to remove the entity from the blacklist; and
remove the identifier of the entity from the blacklist in response to the request.

14. A non-transitory machine-readable storage medium storing instructions that upon execution cause a network device to:
place an interface of the network device in a monitored set of interfaces, in response to determining that a number of multicast groups associated with the interface exceeds a first threshold value;
determine whether a number of multicast communication requests received, by an interface in the monitored set of interfaces, from an entity exceeds a second threshold value;
indicate that the entity is malicious in response to the number of multicast communication requests exceeding the second threshold value; and
block processing of a multicast communication associated with the entity in response to indicating that the entity is malicious.

15. The non-transitory machine-readable storage medium of claim 14, wherein the determining of whether the number of multicast communication requests exceeds the second threshold value comprises determining whether a number of multicast group join requests received from the entity at a port exceeds the second threshold value.

16. The non-transitory machine-readable storage medium of claim 14, wherein the instructions that upon execution cause network device to:
indicate that the entity is malicious, in response to determining that a number of multicast flows received from the entity at the interface exceeds a third threshold value.

17. The non-transitory machine-readable storage medium of claim 14, wherein the interface comprises a port, and wherein the instructions that upon execution cause the network device to:
detect that a number of multicast groups on the port exceeds a number of groups threshold,
wherein the determining is performed in response to detecting that the number of multicast groups on the port exceeds the number of groups threshold.

18. The non-transitory machine-readable storage medium of claim 14, wherein the determining, the indicating, and the blocking are based on a policy of the network device.

19. A method of a network device comprising a processor, comprising:
d in response to determining that a number of multicast groups associated with a port of the network device exceeds a first threshold, placing the port in a monitored set of ports;
determining whether a number of multicast communication requests received, by a port in the monitored set of ports, from an entity exceeds a second threshold;
indicating that the entity is malicious in response to the number of multicast communication requests exceeding the second threshold; and
blocking processing of multicast communication associated with the entity in response to indicating that the entity is malicious.

20. The method of claim 19, wherein the port is a virtual port or a physical port.

* * * * *